United States Patent
Yu et al.

(10) Patent No.: US 8,133,415 B2
(45) Date of Patent: Mar. 13, 2012

(54) INK COMPOSITION FOR MANUFACTURING COLOR FILTER

(75) Inventors: Min-A Yu, Daejeon (KR); Han-Soo Kim, Daejeon (KR); Sun-Hwa Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/048,592

(22) Filed: Mar. 15, 2011

(65) Prior Publication Data

US 2011/0227009 A1 Sep. 22, 2011

(30) Foreign Application Priority Data

Mar. 16, 2010 (KR) .................. 10-2010-0023144

(51) Int. Cl.
G02B 5/23 (2006.01)
G02F 1/1335 (2006.01)

(52) U.S. Cl. .............. 252/586; 106/31.59; 106/31.89; 349/106; 427/67; 522/33; 522/63; 522/65; 523/160; 524/558; 526/310

(58) Field of Classification Search .......... 106/31.46, 106/31.59, 31.89; 252/586; 349/106; 359/885; 427/67; 430/321, 286.1; 522/33, 63, 65; 524/100, 558; 526/218.1, 219, 219.6, 227, 526/232.1, 232.5, 259, 260, 262, 263, 271, 526/273, 310; 523/160
See application file for complete search history.

(56) References Cited

U.S. PATENT DOCUMENTS

| | | | | |
|---|---|---|---|---|
| 6,387,167 | B1 * | 5/2002 | Haldankar | 106/31.59 |
| 2009/0284697 | A1 * | 11/2009 | Asahi et al. | 349/106 |
| 2009/0284698 | A1 * | 11/2009 | Kim et al. | 349/106 |

FOREIGN PATENT DOCUMENTS

JP 2002-243907 8/2002

* cited by examiner

*Primary Examiner* — Harold Pyon
*Assistant Examiner* — Bijan Ahvazi
(74) *Attorney, Agent, or Firm* — McKenna Long & Aldridge LLP

(57) ABSTRACT

Provided is an ink composition for manufacturing color filters. The ink composition includes an acrylic binder resin obtained by polymerizing the group of monomers containing a compound represented by Formula 1. The ink composition has good chemical resistance and adhesive properties and is used for manufacturing color filters exhibiting a high contrast ratio:

Formula 1

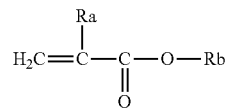

(where Ra is —H, or —CH$_3$, and Rb is an alkyl group having 6-30 carbon atoms).

12 Claims, No Drawings

INK COMPOSITION FOR MANUFACTURING COLOR FILTER

CROSS-REFERENCE TO RELATED APPLICATIONS

This application claims the priority of Korean Patent Application No. 10-2010-23144 filed on Mar. 16, 2010, in the Korean Intellectual Property Office, the disclosure of which is incorporated herein by reference.

BACKGROUND OF THE INVENTION

1. Field of the Invention

The present invention relates to an ink composition for manufacturing color filters, and more particularly, to an ink composition having good chemical resistance and adhesive properties and used for manufacturing color filters exhibiting high contrast ratios.

2. Description of the Related Art

In related art photolithography methods used for manufacturing color filters or black matrices, the resulting color filters exhibit good properties in terms of elaborateness and reproducibility. However, to form pixels, photosensitive compositions including pigments of three primary colors, respectively, should be subject to each process of coating, exposing, developing and curing. This gives rise to problems in that a manufacturing line may be overly lengthened; it becomes difficult to control production yield due to an increase in process-controlling factors; and a thick coating layer is required for high color reproducibility.

To solve these problems, an inkjet method has been proposed, wherein a desired pattern is formed by directly printing a liquid ink on a substrate using an inkjet head.

In the inkjet method, inks including pigments (R, G and B) of three primary colors are sprayed on a substrate, and image regions with each ink colored form pixels having desired patterns. Thus, since a manufacturing process is even simpler than that of related art photolithography methods, and also, as manufacturing costs are relatively low compared to those of related art photolithography methods, the inkjet method is now widely used as a method for manufacturing color filters.

However, a color filter manufacturing process is exposed to lots of chemicals, and therefore, a color filter should have chemical resistance for enduring this process even after the color filter is formed. In particular, an oriented film is coated during a process subsequent to the color filter forming process, and a main solvent of an oriented film material used during this process is NMP. Therefore, when the color filter thus formed is exposed to NMP, it is preferable that resistance to NMP is evaluated and evaluation results are used as an index for chemical resistance in order to prevent pigments from being eluted, swollen and peeled.

As described above, inks which are sprayed on the substrate to form patterned pixels should have high chemical resistance and adhesive properties. If the chemical resistance is insufficient, some pigments contained in the ink may be eluted into a solvent. If the adhesive properties are insufficient, some of the colored ink may be peeled after a heat treatment process. The pigments thus eluted or peeled may cause fatal failure in the manufacturing of LCD panels.

In particular, the recent trend of color filter development requires high color reproducibility and brightness, and pigments should be highly concentrated and atomized. To this end, the content of pigments in an ink composition for manufacturing color filters is increased to give a darker color at the same thickness. However, as the content of pigment increases, the content of other components such as a crosslinking agent, a binder, and resin is relatively reduced. As a result, such changes in contents may cause an ink-coated film to lack sufficient strength, thereby leading to printing failure and a decrease in chemical resistance.

SUMMARY OF THE INVENTION

An aspect of the present invention provides an ink composition with good chemical resistance and adhesive properties which may be used for manufacturing a color filter exhibiting a high contrast ratio, in manufacture of color filters for an image displaying device using an inkjet process.

To this end, according to an aspect of the present invention, there is provided an ink composition for manufacturing color filters, including an acrylic binder resin obtained by polymerizing the group of monomers including the compound represented by Formula 1:

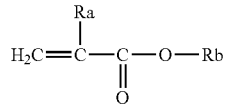

Formula 1

(where Ra is —H, or —CH$_3$, and Rb is an alkyl group having 6-30 carbon atoms)

Further, according to another aspect of the present invention, there is provided an ink composition for manufacturing color filters, including: a pigment; an acrylic binder resin obtained by polymerizing the group of monomers including the compound represented by Formula 1; a melamine compound; and a solvent having a high boiling point.

Further, according to another aspect of the present invention, there is provided a color filter including a binder resin obtained by polymerizing the group of monomers including the compound represented by Formula 1.

Further, according to another aspect of the present invention, there is provided a color filter including: a pigment; a binder resin obtained by polymerizing the group of monomers including the compound represented by Formula 1; and a melamine compound.

DETAILED DESCRIPTION OF THE PREFERRED EMBODIMENT

As used throughout this disclosure, '(meth)acrylic' refers to acrylic or methacrylic; '(meth)acrylate' refers to acrylate or methacrylate; '(meth)acrylic acid' refers to acrylic acid or methacrylic acid.

Exemplary embodiments of the present invention will now be described in detail.

According to an embodiment of the present invention, an ink composition includes an acrylic binder resin obtained by polymerizing the group of monomers including the compound represented by Formula 1.

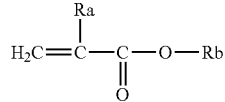

Formula 1

(where Ra is —H, or —CH$_3$, and Rb is an alkyl group having 6-30 carbon atoms)

In particular, the compound represented by Formula 1 may be laurylmethacylate such as the compound represented by Formula 2.

Formula 2

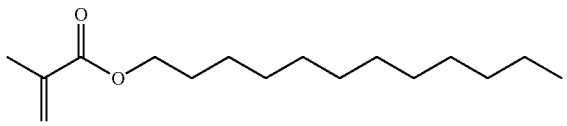

The group of monomers, in addition to the compound represented by Formula 1, may further include at least one compound selected from (meth)acrylic monomers having carboxylic groups such as crotonic acid, propionic acid, methacrylic acid, isocrotonic acid, vinylacetic acid, 2-pentenoic acid, trans-2-pentenoic acid, 3-pentenoic acid, trans-3-pentenoic acid, allylic acetic acid, maleic acid, fumaric acid, tiglic acid, angelic acid, citraconic acid, and mesaconic acid; methacrylate ester monomers such as methyl(meth)acrylate, ethyl(meth)acrylate, propyl(meth)acrylate, butyl(meth)acrylate, allyl(meth)acrylate, 2-ethylhexyl(meth)acrylate, hydroxyethyl(meth)acrylate, hydroxypropyl(meth)acrylate, benzyl(meth)acrylate, hydroxyphenyl(meth)acrylate and methoxyphenyl(meth)acrylate; acrylic monomers having ethylenic double bonds in side chains; N-phenylmaleimide; and styrene.

The compound represented by Formula 1 may be included in the group of monomers in an amount of 5-50-mole % based on a total of 100 mole % of the group of monomers. If the amount is less than 5 mole %, adhesive properties to ink may become insufficient. If the amount is greater than 50 mole %, the content of other monomers to improve properties other than chemical resistance required for an ink film of a color filter such as low heat shrinkage, high film hardness, and jetting properties is lowered, and thus the properties of the ink film may be lowered.

Further, according to another embodiment of the present invention, an ink composition includes: a pigment; an acrylic binder resin obtained by polymerizing the group of monomers including the compound represented by Formula 1; a melamine compound; and a solvent having a high boiling point.

The acrylic binder resin may be included in an amount of 1-20 wt % with respect to the total weight of the ink composition.

The pigment is used to impart a color to ink, and the following pigments may be used.

As a red pigment, the following pigments may be used: naphthol-based red pigments such as Pig.Red #1 (C.I.12070), Pig.Red #2 (C.I.12310), Pig.Red #3 (C.I.12120), Pig.Red #4(C.I.12085), Pig.Red #5 (C.I.12490), Pig.Red #6 (C.I.12090), Pig.Red #7(C.I.12420), Pig.Red #8 (C.I.12355), Pig.Red #9 (C.I.12460), Pig.Red #10 (C.I.12440), Pig.Red #11(C.I.12430), Pig.Red #12(C.I.12385), Pig.Red #13 (C.I.12395), Pig.Red #14(C.I.12380), Pig.Red #15 (C.I.12465), Pig.Red #16(12500), Pig.Red #17(C.I.12390), Pig.Red #18(C.I.12350), Pig.Red #21(C.I.12300), Pig.Red #22(C.I.12315), Pig.Red #23(C.I.12355), Pig.Red #31(12360), Pig.Red #32(12320), Pig.Red #95(C.I.15897), Pig.Red #112(C.I.12370), Pig.Red #114(C.I.12351), Pig.Red #119(C.I.12469), Pig.Red #146(C.I.12485), Pig.Red #147(C.I.12433), Pig.Red #148(C.I.12369), Pig.Red #150(C.I.12290), Pig.Red #151(C.I.15890), Pig.Red #184(C.I.12487), Pig.Red #187(C.I.12486), Pig.Red #188(C.I.12467), Pig.Red #210(C.I.12474), Pig.Red #245(C.I.12317), Pig.Red #253(C.I.12375), Pig.Red #258(C.I.12318), Pig.Red #261(C.I.12468); naphthol-based metal composites such as Pig.Red #49 (C.I.15630), Pig.Red #49:1(C.I.15630:1), Pig.Red #49:2 (C.I.15630:2), Pig.Red #49:3(C.I.15630:3), Pig.Red #50:1 (C.I.15500:1), Pig.Red #51:1(C.I.15580:1), Pig.Red #53 (C.I.15585), Pig.Red #53:1(C.I.15585:1), Pig.Red #68 (C.I.15525), Pig.Red #243(C.I.15910), Pig.Red #247 (C.I.15915); disazopyrazolone-based pigments such as Pig.Red #37(C.I.21205), Pig.Red #38(C.I.21210), Pig.Red #41(C.I.21200); disazo-based condensates such as Pig.Red #144(0.1.20735), Pig.Red #166(0.1.20035), Pig.Red #220 (0.1.20055), Pig.Red #221(0.1.20065), Pig.Red #242(0.1.20067); 2-hydroxy-3-naphthoic acid-based metal composites such as Pig.Red #48:1(0.1.15865:1), Pig.Red #48:2(0.1.15865:2), Pig.Red #48:3(0.1.15865:3), Pig.Red #48:4(0.1.15865:4), Pig.Red #48:5(0.1.15865:5), Pig.Red #52:1(0.1.15860:1), Pig.Red #52:2(0.1.15860:2), Pig.Red #57:1(0.1.15850:1), Pig.Red #58:2(0.1.15825:2), Pig.Red #58:4(0.1.15825:4), Pig.Red #63:1(0.1.15880:1), Pig.Red #63:2(C.I.15880:2), Pig.Red #64(0.1.15800), Pig.Red #64:1 (0.1.15800:1), Pig.Red #200(0.1.15867); naphthalenesulfonic acid metal composites such as Pig.Red #60:1(0.1.16105:1), Pig.Red #66(C.I.18000:1), Pig.Red #67 (0.1.18025:1); triarylcarbonium-based pigments such as Pig.Red #81:1(0.1.45160:1), Pig.Red #81:3(0.1.45160:3), Pig.Red #169(0.1.45160:2); anthraquinone-based pigments such as Pig.Red #89(0.1.60745), Pig.Red #177(65300); thioindigo-based pigments such as Pig.Red #88(0.1.73312), Pig.Red #181(0.1.73360); quinacridone-based pigments such as Pig.Red #122(0.1.73915), Pig.Red #207(0.1.73900), Pig.Red #209(0.1.73905); perylene-based pigments such as Pig.Red #123(0.1.71145), Pig.Red #149(0.1.71137), Pig.Red #178(0.1.71155), Pig.Red #179(0.1.71130), Pig.Red #190(0.1.71140), Pig.Red #194(0.1.71100), Pig.Red #224(C.I.71127); benzimidazolone-based pigments such as Pig.Red #171(C.I.12512), Pig.Red #175(C.I.12513), Pig.Red #176(C.I.12515), Pig.Red #185(C.I.12516), Pig.Red #208(C.I.12514); penanthrone-based pigments such as Pig.Red #216(C.I.59710); diketopyrrolopyrrole-based pigments such as Pig.Red #254(C.I.56110); isoindoline-based pigments such as Pig.Red #260(C.I.56295); and the like.

As a violet pigment, the following pigments may be used: triarylcarbonium-based pigments such as Pig.Violet#1 (C.I.45170:2), Pig.Violet#2(C.I.45175:1), Pig.Violet#3 (C.I.42535:2), Pig.Violet#27(C.I.42535:3), Pig.Violet#39 (C.I.42555:2); anthraquinone-based pigments such as Pig.Violet#5:1(C.I.58055:1); naphthol-based pigments such as Pig.Violet#25(C.I.12321), Pig.Violet#50(C.I.12322); quinacridone-based pigments such as Pig.Violet#19 (C.I.73900); dioxazine-based pigments such as Pig.Violet#23(C.I.51319), Pig.Violet#37(C.I.51345); perylene-based pigments such as Pig.Violet#29(C.I.71129); benzimidazolone-based pigments such as Pig.Violet#32 (C.I.12517); and the like.

As a blue pigment, the following pigments may be used: triarylcarbonium-based pigments such as Pig.Blue#1 (C.I.42595:2), Pig. Blue#2(C.I.44045:2), Pig.Blue#9 (C.I.42025:1), Pig.Blue#10(C.I.44040:2), Pig.Blue#14 (C.I.42600:1), Pig.Blue#18(C.I.42770:1), Pig.Blue#19 (C.I.42750), Pig.Blue#56(C.I.42800), Pig.Blue#62 (C.I.44084); Cu phthalocyanine-based pigments such as Pig.Blue#15(C.I.74160), Pig.Blue#15:1(C.I.74160), Pig. Blue#15:2(C.I.74160), Pig.Blue#15:3(C.I.74160), Pig. Blue#15:4(C.I.74160), Pig.Blue#15:6(C.I.74160); metalfree phthalocyanine-based pigments such as Pig.Blue#16 (C.I.74100); indanthrone-based pigments such as Pig.Blue#60(C.I.69800), Pig.Blue#64(C.I.69825); indigo-based pigments such as Pig.Blue#66(C.I.73000), Pig.Blue#63(C.I.73015:x); and the like.

As a green pigment, the following pigments may be used: triarylcarbonium-based pigments such as Pig.Green#1 (C.I.42040:1), Pig.Green#2(C.I.42040:1), Pig.Green#4 (C.I.42000:2); Cu phthalocyanine-based pigments such as Pig.Green#7(C.I.74260), Pig.Green#36(C.I.74265); metal composites such as Pig.Green#8(C.I.10006), Pig.Green#10 (C.I.12775); and the like.

As a yellow pigment, the following pigments may be used: monoazo-based pigments such as Pig.Yellow#1(C.I.11680), Pig.Yellow#2(C.I.11730), Pig.Yellow#3(C.I.11710), Pig.Yellow#5(C.I.11660), Pig.Yellow#6(C.I.11670), Pig.Yellow#10(C.I.12710), Pig.Yellow#49(C.I.11765), Pig.Yellow#65(C.I.11740), Pig.Yellow#73(C.I.11738), Pig.Yellow#74(C.I.11741), Pig.Yellow#75(C.I.11770), Pig.Yellow#97(C.I.11767), Pig.Yellow#98(C.I.11727), Pig.Yellow#111(C.I.11745), Pig.Yellow#116(C.I.11790), Pig.Yellow#167(C.I.11737); monoazo-based metal composites such as Pig.Yellow#61(C.I.13880), Pig.Yellow#62:1 (C.I.13940:1), Pig.Yellow#100(C.I.19140:1), Pig.Yellow#168(C.I.13960), Pig.Yellow#169(C.I.13955), Pig.Yellow#183(C.I.18792); bisacetoacetearylide-based pigments such as Pig.Yellow#16(C.I.20040); diarylide-based pigments such as Pig.Yellow#12(C.I.21090), Pig.Yellow#13 (C.I.21100), Pig.Yellow#14(C.I.21095), Pig.Yellow#17 (C.I.21105), Pig.Yellow#55(C.I.21096), Pig.Yellow#63 (C.I.21091), Pig.Yellow#81(C.I.21127), Pig.Yellow#83 (C.I.21108), Pig.Yellow#87(C.I.21107:1), Pig.Yellow#113 (C.I.21126), Pig.Yellow#114(C.I.21092), Pig.Yellow#124 (C.I.21107), Pig.Yellow#126(C.I.21101), Pig.Yellow#127 (21102), Pig.Yellow#152(C.I.21111), Pig.Yellow#170 (C.I.21104), Pig.Yellow#171(C.I.21106), Pig.Yellow#172 (C.I.21109), Pig.Yellow#174(C.I.21098); flavanthrone-based pigments such as Pig.Yellow#24(C.I.70600); diazo-based condensates such as Pig.Yellow#93(C.I.20710), Pig.Yellow#94(C.I.20038), Pig.Yellow#95(C.I.20034), Pig.Yellow#128(C.I.20037), Pig.Yellow#166(C.I.20035); anthraquinone-based pigments such as Pig.Yellow#123 (C.I.65049), Pig.Yellow#147(C.I.60645); aldazine-based pigments such as Pig.Yellow#101(C.I.48052); naphthalene-sulfonic acid metal composites such as Pig.Yellow#104 (C.I.15985:1); anthra pyrimidine-based pigments such as Pig.Yellow#108(C.I.68420); isoindolinone-based pigments such as Pig.Yellow#109(C.I.56284), Pig.Yellow#110 (C.I.56280), Pig.Yellow#139(C.I.56298), Pig.Yellow#185 (C.I.56290); benzimidazolone-based pigments such as Pig.Yellow#123(C.I.11783), Pig.Yellow#154(C.I.13980), Pig.Yellow#175(C.I.11784), Pig.Yellow#180(C.I.21290), Pig.Yellow#181(C.I.11777); quinophthalone-based pigments such as Pig.Yellow#138(C.I.56300); metal composites such as Pig.Yellow#117(C.I.48043), Pig.Yellow#129 (C.I.48042), Pig.Yellow#150(C.I.12764), Pig.Yellow#153 (C.I.48545), Pig.Yellow#177(C.I.48120), Pig.Yellow#179 (C.I.48125); and the like.

As an orange pigment, the following pigments may be used: monoazo-based pigments such as Pig.Orange#1 (C.I.11725), Pig.Orange#6(C.I.12730); naphthol-based pigments such as Pig.Orange#2(C.I.12060), Pig.Orange#5 (C.I.12075), Pig.Orange#22(C.I.12470), Pig.Orange#24 (C.I.12305), Pig.Orange#38(C.I.12367); naphthol metal composites such as Pig.Orange#17(C.I.15510:1 Pig.Orange#17:1(15510:2), Pig.Orange#46(C.I.15602); disazo pyrazolone-based pigments such as Pig.Orange#13 (C.I.21110), Pig.Orange#34(C.I.21115); diarylide-based pigments such as Pig.Orange#15(C.I.21130), Pig.Orange#16 (C.I.21160); naphthalenesulfonic acid metal composites such as Pig.Orange#19(C.I.15990); disazo-based condensates such as Pig.Orange#31(C.I.20050); benzimidazolone-based pigments such as Pig.Orange#36(C.I.11780), Pig.Orange#60 (C.I.11782); penanthrone-based pigments such as Pig.Orange#40(C.I.59700); perinone-based pigments such as Pig.Orange#43(C.I.71105); quinacridone-based pigments such as Pig.Orange#48(C.I.73900); isoindoline-based pigments such as Pig.Orange#61(C.I.11265), Pig.Orange#66 (C.I.48210), Pig.Orange#69(C.I.56292); and the like.

The pigment may be used as a mixture of two or more pigments, and may be included in an amount of 2-15 wt % with respect to the total weight of the ink composition depending on a desired color and color and film properties.

In particular, the pigment may further include a pigment-dispersing agent. The pigment-dispersing agent is added to enhance the dispersion of pigment and prevent the pigment from re-aggregating after dispersion.

The pigment-dispersing agent is adsorbed on the surface of pigment using an anchor such as acidic or basic groups. Since the stability of dispersion is maintained by a repelling effect of polymers, the pigment-dispersing agent may be preferably a polymer having acidic or basic groups.

In terms of good adsorptive properties, the acidic group may be a sulfone group, and the basic group may be an amino group.

Comb-type polymers having a structure in which branched polymers are grafted to a backbone polymer having acidic or basic groups may be desirable as the dispersing agent having acidic or basic groups, since they have high solubility in organic solvents due to good steric repelling effect of branched polymers. In addition, comb-type polymers having a structure in which two or more molecules of branched polymers are grafted to one molecule of a backbone polymer may be desirable for the same reason.

Examples of commercially available resin-type dispersing agents include Disperbyk-101, 103, 107, 108, 110, 111, 116, 130, 140, 154, 161, 162, 163, 164, 165, 166, 170, 171, 174, 180, 181, 182, 183, 184, 185, 190, 2000, 2001, or Anti-Terra-U, 203, 204, or BYK-P104, P104S, 220S, or Lactimon, Lactimon-WS or Bykumen, etc. made by BIC-CHEMI; SOL-SPERSE-3000, 9000, 13240, 13650, 13940, 17000, 18000, 20000, 21000, 24000, 26000, 27000, 28000, 31845, 32000, 32500, 32600, 34750, 36600, 38500, 41000, 41090, 53095, etc. made by NIPPON RUBRIZOL; EFKA-46, 47, 48, 452, LP4008, 4009, LP4010, LP4050, LP4055, 400, 401, 402, 403, 450, 451, 453, 4540, 4550, LP4560, 120, 150, 1501, 1502, 1503, etc. made by AFCA CHEMICALS.

The pigment-dispersing agent may be included in an amount of 1-10 wt % with respect to the total weight of the ink composition.

As the melamine compound, the compound represented by Formula 3 may be used.

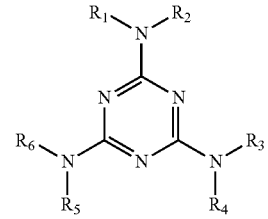

Formula 3

(where $R_1$, $R_2$, $R_3$, $R_4$, $R_5$ and $R_6$ each independently represent the compounds including hydrogen, a $C_{1-6}$ alkyl group, a $C_{1-6}$ alkoxy group, a carboxyl group, a $C_{1-6}$ ether group, a $C_{1-6}$ alcohol group, an amino group, a nitro group, a hydroxyl group, a phenyl group or an acryl group).

The melamine compound is used to improve the heat resistance of ink. In the manufacturing process of color filters, the dispersion of pigment may be disrupted during a post-baking process for the formation of an ink film or a high temperature treatment in post-processes (formation of oriented film), and thus phenomena such as the aggregation of pigment may be generated, leading to the reduction of contrast of a film of a color filter. It is possible to prevent such a reduction of contrast by using the melamine compound. In particular, at least two or more of $R_1$, $R_2$, $R_3$, $R_4$, $R_5$ and $R_6$ in the compound represented by Formula 3 may preferably have substituents other than hydrogen. When the melamine compound has substituents other than hydrogen, cross-linking reactions with other compounds are well performed, and thus the heat resistance and dispersion of pigment may be greatly improved. More preferably, at least three or more of $R_1$, $R_2$, $R_3$, $R_4$, $R_5$ and $R_6$ in the compound represented by Formula 3 may have substituents other than hydrogen.

Furthermore, since the melamine compound has lower viscosity than that of binder or general cross-linking agent, the melamine compound added to ink may lower the ink's viscosity. In the case of the ink composition for a color filter used in a general inkjet process, a viscosity suitable for jetting is limited to the range of 10-18 cP. When the melamine compound is added to ink instead of a cross-linking agent for binder resins, the melamine compound acts as the cross-linking agent between binder resins. That is, by adding the melamine compound, the content of a normally contained cross-linking agent may be decreased. As a result, the addition of a melamine compound has an advantage that the content of solids may be relatively increased as the viscosity of ink is reduced. In other words, when the melamine compound is not added to ink, the solids may not be increased due to the limitation of viscosity. However, when the melamine compound is added to ink, since the viscosity of ink is reduced, the solids may be increased by about 1-2%. This nature is beneficial to an inkjet process in which the drop number of ink filled in a pixel is decreased as the content of solids in the ink is increased (the reduction of step height in a pixel and tack time). Also, since a smaller amount of materials may be used, it is also economically beneficial.

The melamine compound may be included in an amount of 1-20 wt % with respect to the total weight of the ink composition. If the amount is less than 1 wt %, the effects of preventing the lowering of contrast ratio and improving the dispersion of ink after a high temperature treatment may be insufficient. If the amount is greater than 20 wt %, the content of other compounds such as a pigment may be undesirably reduced. In particular, if the content of pigment is excessively decreased, it may be difficult to obtain a desired color at a desired thickness.

As the solvent having a high boiling point, low-volatile solvents having a boiling point of 150° C. or more may be desirable. Preferably, one or two or more solvents selected from the group consisting of diethyleneglycol monobutyl ether acetate, diethyleneglycol monoethyl ether acetate, dipropyleneglycol methylether acetate, diethyleneglycol monobutyl ether, diethyleneglycol monoethyl ether, diethyleneglycol methylbutyl ether, methoxyethanol, ethoxy ethanol, butoxy ethanol, butoxy propanol, ethoxy ethyl acetate, and butoxy ethyl acetate may be used, but not limited to these.

The solvent having a high boiling point may be included in an amount of 40-90 wt % with respect to the total weight of the ink composition. If the amount is less than 40 wt %, the viscosity of ink may be undesirably increased. If the amount is greater than 90 wt %, the content of solids in the ink composition is reduced, and thus it may be difficult to obtain a sufficient film thickness during ink-jetting.

According to an embodiment of the present invention, optionally an ink composition may further include polymerizable monomers. Contrary to general compositions for manufacturing color filters, the ink composition according to the present invention does not necessarily include polymerizable monomers having ethylenic unsaturated double bonds. The reason for this is that the melamine compound and binder resin complement the function of polymerizable monomers. However, polymerizable monomers may be optionally included in the ink composition in order to enhance chemical resistance.

If the polymerizable monomer is included in the ink composition of the present invention, it may be included in an amount of 1-20 wt %.

As the polymerizable monomer, functional monomers having two or more addition-polymerizable unsaturated groups per molecule among multifunctional monomers having ethylenic unsaturated double bonds may be used without limitation. Monomers having three or more ethylenic functional groups may be more desirable.

Non-limited examples of the polymerizable monomer include ethyleneglycoldiacrylate, triethyleneglycoldiacrylate, 1,3-butanedioldiacrylate, neopentylglycoldiacrylate, 1,6-hexanedioldiacrylate, trimethyloltriacrylate, trimethylolpropanetriacrylate, pentaerythritoltriacrylate, ditrimethylolpropanetetraacrylate, dipentaerythritolteraacrylate, dipentaerythritolpentaacrylate, and dipentaerythritolhexaacrylate, and the like.

According to an embodiment of the present invention, an ink composition may optionally further include a thermal initiator. The thermal initiator is added to help the polymerizable monomers to polymerize. It may be optionally added to the ink composition like the aforementioned polymerizable monomers.

If the thermal initiator is further included in the ink composition of the present invention, it may be included in an amount of 0.1-5 wt % with respect to the total weight of the ink composition.

If the amount is less than 0.1 wt %, radicals are generated insufficiently, and thus the degree of curing of color ink film may be reduced, leading to the lowering of film strength and chemical resistance. If the amount is greater than 5 wt %, viscosity is increased and fumes may be generated due to excess initiators.

The thermal initiator may use two or more materials selected from azo compounds, organic peroxides, and Hydrogen peroxide, but is not limited thereto.

With respect to the numerical range of amount of the thermal initiator used, when the range set forth above is met, radicals are generated sufficiently, and thus thermal polymerization may properly proceed, resulting in preventing surface badness of a film of a color filter caused by the insufficient dissolution of a thermal initiator.

According to an embodiment of the present invention, in addition to the aforementioned compounds, an ink composition may further include other additives such as a surfactant, a defoaming agent, an adhesion-enhancing agent, and the like. These additives may be each included in an amount of 0.1-0.5 wt % with respect to the total weight of the ink composition.

Such additives may use, without limitation, usual additives widely used in the art. The further description of such additives will be omitted since the related-matters are well appreciated by a person skilled in the art.

A color filter according to the present invention includes an acrylic binder resin obtained by polymerizing the group of monomers including the compound represented by Formula 1. A color filter according to the present invention may be manufactured using the aforementioned ink composition according to the present invention. Since a manufacturing process of the color filter follows usual methods for manufacturing color filters known in the art, the detailed description will be omitted.

Hereinafter, the present invention will be described in detail with reference to Examples, but the present invention should not be seen as being limited to these Examples.

EXAMPLE

Synthesis of Binder Resin A

To a reactor, 1.6 parts by weight (hereinafter, all parts refers to parts by weight) of a thermal initiator (V65) dissolved in a solvent were added, and benzylmethacrylate, N-phenylmaleimide, styrene, methacrylic acid, and Lauryl methacrylate are added at the molar ratio of 52:9:10:12:17. The resulting mixture was reacted at 65° C. for 7.5 hours under a nitrogen atmosphere to give a binder resin A.
Preparation of Ink Composition An ink composition was prepared by mixing a solution having a Blue pigment dispersed therein (including a pigment at 6.30 parts+a dispersing agent 4.94 parts), as well as 5.49 parts of the synthesized binder resin A (weight average molecule weight in terms of polystyrene: 14200 g/mol; acid value: 47.12 KOHmg/g), 5.51 parts of hexamethoxymethylmelamine, 4.41 parts of dipentaerythritol hexaacrylate (DPHA) which is polymerizable compound, 57.0 parts of butylcarbitol acetate, 8.3 parts of butylcarbitol, and 7.7 parts of diethyleneglycolmethylbutylether which are solvents, 0.06 parts of a surfactant, and 0.03 parts of an adhesion-enhancing agent.

COMPARATIVE EXAMPLE

Synthesis of Binder Resin B

Excluding Lauryl methacrylate, Benzylmethacrylate, N-phenylmaleimide, styrene, methacrylic acid were added at the molar ratio of 65:11:13:11. A binder resin B was prepared under the same conditions as in the Example.
Preparation of Ink Composition An ink composition for color filters was prepared under the same condition as the Example except for using the synthesized binder resin B (weight average molecule weight in terms of polystyrene: 13600 g/mol; acid value: 46.48 KOHmg/g), instead of the binder resin A.

EXPERIMENTAL EXAMPLE

Evaluation of Chemical Resistance

The following experiments are performed to test the chemical resistance of the ink composition prepared according to the present invention.

Each of solutions of the ink compositions prepared in the Example and the Comparative Example was spin-coated on a glass substrate, pre-baked at about 90° C. for 3 minutes, and then post-baked in an IR oven (heater temperature: 260-270° C.; atmosphere temperature: 200° C.) for 2 minutes to form a film.

The chemical resistance for each ink composition was determined as follows: the color coating film thus formed on the glass substrate was cut into a piece 1 cm×5 cm. The cut piece was immersed in 16 g of NMP (N-methylpyrrolidone) at 80° C. for 40 minutes. Then, the absorbance for the solutions with pigment eluted therein is measured using a UV-Vis spectrometer. The test results for chemical resistance are shown in Table 1.

TABLE 1

|  | Peak values at 671 nm | | | Generation of peeling between glass substrate and ink film |
| --- | --- | --- | --- | --- |
| Example | 1.16 | 1.05 | 1.23 | No |
| Comparative Example | 1.60 | 1.55 | 1.57 | Yes |

Since the blue pigment was used in the Example and the Comparative Example, the absorbance thereof was measured at 672 nm. It may be considered that the lower the absorbance, the smaller the amount of pigment eluted, and thus better chemical resistance. From the above results, it can be seen that the absorbance for the Example is significantly lower than that for the Comparative Example. Thus, it may be demonstrated that the ink composition of the Example has higher chemical resistance (solvent resistance) as compared to the Comparative Example.

As set forth above, according to exemplary embodiments of the invention, an ink composition according to the present invention can have good chemical resistance and adhesive properties and be used for manufacturing color filters exhibiting a high contrast ratio.

While the present invention has been shown and described in connection with the exemplary embodiments, it will be apparent to those skilled in the art that modifications and variations can be made without departing from the spirit and scope of the invention as defined by the appended claims.

What is claimed is:

1. An ink composition for manufacturing color filters, the ink composition comprising:
   2-15 wt % of a pigment;
   1-10 wt % of a pigment-dispersing agent;
   1-20 wt % of an acrylic binder resin obtained by polymerizing monomers consisting of benzylmethacrylate, N-phenylmaleimide, styrene, methacrylic acid and laurylmethacrylate;
   1-20 wt % of a melamine compound; and
   40-90 wt % of a solvent having a high boiling point.

2. The ink composition according to claim 1, further comprising a polymerizable monomer having three or more ethylenic functional groups.

3. The ink composition according to claim 2, wherein 1-20% by weight of the polymerizable monomer is contained in the ink composition.

4. A color filter comprising the ink composition defined in claim 3.

5. A color filter comprising the ink composition defined in claim 2.

6. The ink composition according to claim 1, further comprising at least one polymerizable monomer consisting of ethyleneglycoldiacrylate, triethyleneglycoldiacrylate, 1,3-butanedioldiacrylate, neopentylglycoldiacrylate, 1,6-hexanedioldiacrylate, trimethyloltriacrylate, trimethylolpropanetriacrylate, pentaerythritoltriacrylate, ditrimethylolpropanetetraacrylate, dipentaerythritoltetraacrylate, dipentaerythritolpentaacrylate, and dipentaerythritolhexaacrylate.

7. A color filter comprising the ink composition defined in claim 6.

8. The ink composition according to claim 1, wherein the pigment is a blue pigment.

9. A color filter comprising the ink composition defined in claim 8.

10. The ink composition according to claim 1, further comprising a surfactant and an adhesion-enhancing agent.

11. A color filter comprising the ink composition defined in claim 10.

12. A color filter comprising the ink composition defined in claim 1.

* * * * *